(12) United States Patent
Kim

(10) Patent No.: US 7,495,698 B2
(45) Date of Patent: Feb. 24, 2009

(54) COMPACT HOLDER FOR MEMORY STORAGE DEVICE AND DIGITAL IMAGE PROCESSING APPARATUS HAVING THE SAME

(75) Inventor: Dong-hyeon Kim, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 662 days.

(21) Appl. No.: 11/156,742

(22) Filed: Jun. 20, 2005

(65) Prior Publication Data

US 2006/0125933 A1 Jun. 15, 2006

(30) Foreign Application Priority Data

Dec. 15, 2004 (KR) .................... 10-2004-0106161

(51) Int. Cl.
*H04N 5/76* (2006.01)
*G06F 13/00* (2006.01)
(52) U.S. Cl. .................... 348/231.8; 711/115
(58) Field of Classification Search ............ 348/231.99, 348/231.7, 231.8, 231.9, 373, 374, 375, 376; 711/115; 439/630, 631
See application file for complete search history.

(56) References Cited

U.S. PATENT DOCUMENTS

| | | | | |
|---|---|---|---|---|
| 2002/0191089 | A1* | 12/2002 | Ikeda | 348/231.7 |
| 2004/0039876 | A1* | 2/2004 | Nelson et al. | 711/115 |
| 2005/0046709 | A1* | 3/2005 | Nagai | 348/231.8 |

FOREIGN PATENT DOCUMENTS

| | | | |
|---|---|---|---|
| JP | 2001-273465 A | | 10/2001 |
| JP | 2001273465 A | * | 10/2001 |
| JP | 2003-234935 A | | 8/2003 |
| JP | 2004-046608 A | | 2/2004 |

* cited by examiner

*Primary Examiner*—Jason T. Whipkey
(74) *Attorney, Agent, or Firm*—Drinker Biddle & Reath LLP

(57) ABSTRACT

A memory card holder in which different types of memory cards are compatible, and a digital image processing apparatus using the memory card slot. The memory card holder and digital image processing apparatus each includes: a plurality of memory card accommodating units that are formed at a predetermined angle from each other and share a predetermined space to accommodate memory cards of different standards; and connecting ports that are formed on one side of each of the plurality of memory card accommodating units. The digital image processing apparatus has a storage medium, such as a removable memory card of a predetermined standard, in which is stored an image of a subject that is photographed and converted into digital signals.

20 Claims, 5 Drawing Sheets

COMPACT HOLDER FOR MEMORY STORAGE DEVICE AND DIGITAL IMAGE PROCESSING APPARATUS HAVING THE SAME

BACKGROUND OF THE INVENTION

This application claims the priority of Korean Patent Application No. 10-2004-0106161, filed on Dec. 15, 2004 in the Korean Intellectual Property Office, the disclosure of which is incorporated herein in its entirety by reference.

1. Field of the Invention

The present invention relates to a memory card module, and a digital image processing apparatus having the same, and more particularly, to a holder for a memory card that can recognize a plurality of memory cards, and a digital image processing apparatus having the same.

2. Description of the Related Art

FIG. 1 is a perspective view of an exemplary conventional digital image processing apparatus 10, and FIG. 2 is a side view of the digital image processing apparatus 10 shown in FIG. 1 with a side cover 18 open.

Referring to FIG. 1, the digital image processing apparatus includes a main body 17, a barrel 11 on the front of the main body 17, and a flash 12.

A shutter button 14, a power switch 15, and a flash state displaying light 16 are installed on the main body 17 so that a user may manipulate the digital image processing apparatus 10. The barrel 11 includes a plurality of lenses, and receives light reflected from a subject to form an image on an image sensor module (not shown) included in the barrel 11.

The flash 12 is placed on the front of the main body 17 so that it can flash when photographing in a dark place.

Referring to FIG. 2, a battery module 75 and a memory card slot 70 are installed in the digital image processing apparatus 10. The battery module 75 includes a battery slot 21 that accommodates a battery (not shown) needed to drive the digital image processing apparatus 10, and a battery lock lever 22. The memory card slot 70 includes memory card accommodating units 19 and 20 to accommodate memory cards for storing digital information of photographed images.

Memory cards for digital image processing apparatuses are available in a variety of different types such as a security digital (SD) card, a compact flash (CF) card, a micro drive (MD) card, a multi media card (MMC), a memory stick (MS), an xD-Picture Card, a smart media card (SMC), etc. Consequently, digital image processing apparatuses include a memory connecting module that can accommodate various types of memory cards.

As illustrated in FIG. 2, the digital image processing apparatus 10 includes two memory card accommodating units 19 and 20 to recognize memory cards of two different size standards. However, this will not accommodate all of the various memory cards described above because each one is a different size. In the conventional art, a digital processing apparatus that accommodates different sized memory cards must have a different memory card slot for each of the different sized memory cards. This increases the size of the digital apparatus and is against the current trend to miniaturize and make light-weight digital apparatuses such as digital cameras. As a result, there is a need for a memory card slot that is of a small size and can use a plurality of memory cards.

SUMMARY OF THE INVENTION

The present invention provides a small-sized memory card holder that can recognize different types of memory cards. One of the benefits of this invention is that it allows a more compact design of a digital image processing apparatus having the memory card holder.

According to an aspect of the present invention, there is provided a memory card holder including: a plurality of memory card accommodating units to accommodate memory cards of different sizes, wherein the accommodating units are formed at a predetermined angle from each other and share a predetermined space; and connecting ports formed on one side of each of the plurality of memory card accommodating units.

Here, the memory card holder further includes a cover that covers a top of the plurality of memory card accommodating units.

According to another aspect of the present invention, there is provided a digital image processing apparatus including a storage medium in which is stored an image of a subject that is photographed and converted into digital signals. The digital image processing apparatus includes: a plurality of memory card accommodating units that are formed at a predetermined angle from each other, share a predetermined space, and accommodate memory cards of different sizes; and connecting ports that are formed on one side of each of the plurality of memory card accommodating units. The storage medium is a memory card of a predetermined standard that is removably connected to the digital image processing apparatus.

Here, the respective memory card accommodating units are shaped like corresponding memory cards, and have a portion that is recessed from the surrounding rear surface of a digital image processing apparatus.

At here, the digital image processing apparatus further includes a cover that covers a top of the memory card accommodating units.

Also, the memory card accommodating units are shaped in slots on one side of the digital image processing apparatus. In this case, two of the memory card accommodating units may be formed to cross each other at a right angle.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
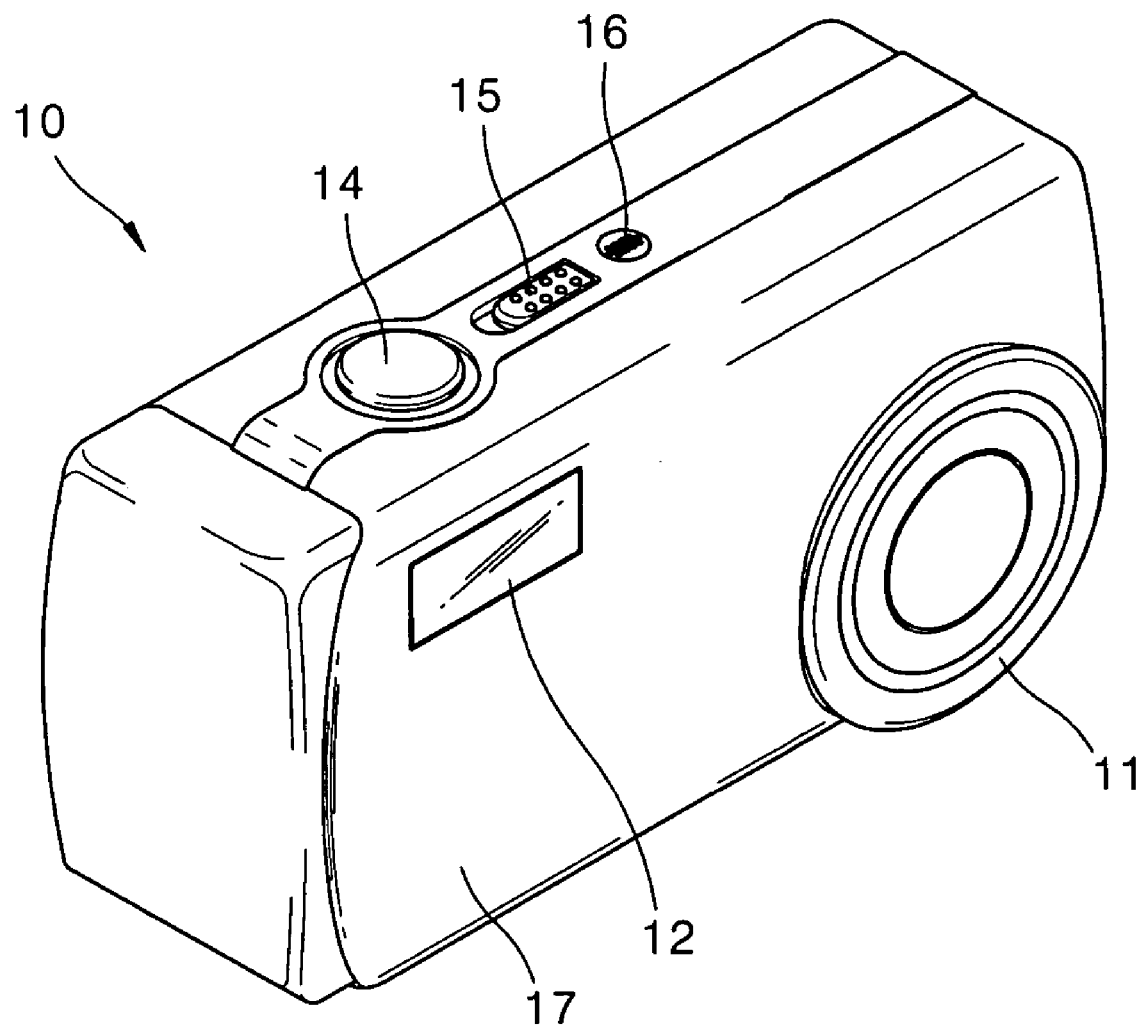
FIG. 1 is a perspective view of a conventional digital image processing apparatus.
Figure 2:
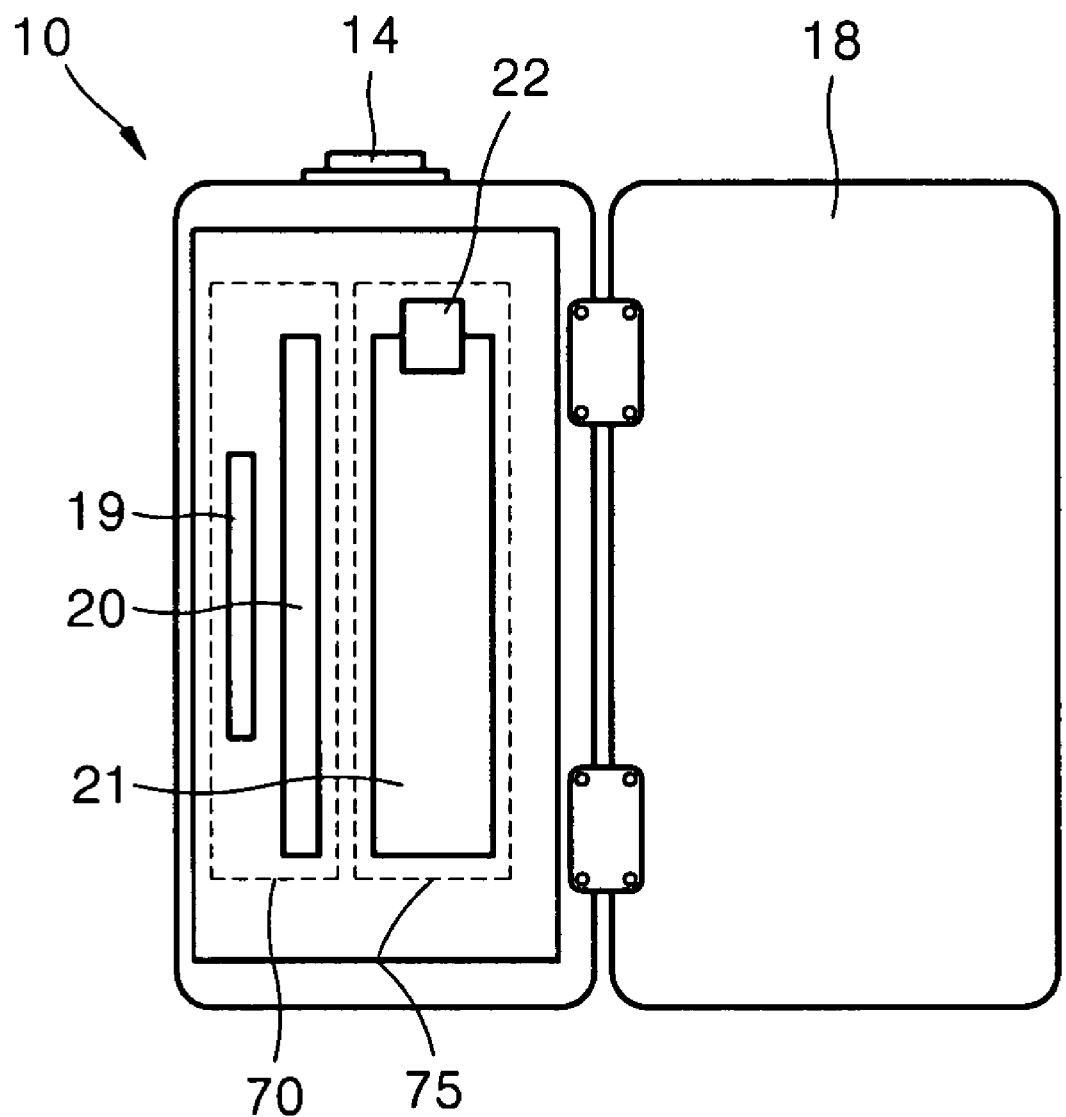
FIG. 2 is a side view of the digital image processing apparatus of FIG. 1 with a side cover open.

A digital image processing device according to the present invention will now be described more fully with reference to the accompanying drawings, in which exemplary embodiments of the digital image processing device are shown. Elements of the digital image processing device that are the same as those of the conventional digital image processing apparatus show in FIGS. 1 and 2 are denoted with the same reference numerals.

The digital image processing device includes a storage medium that can store digital information of a photographed or recorded subject. The storage medium is a general memory card. The digital image processing apparatus includes a memory card slot to accommodate the memory card.

Figure 3:
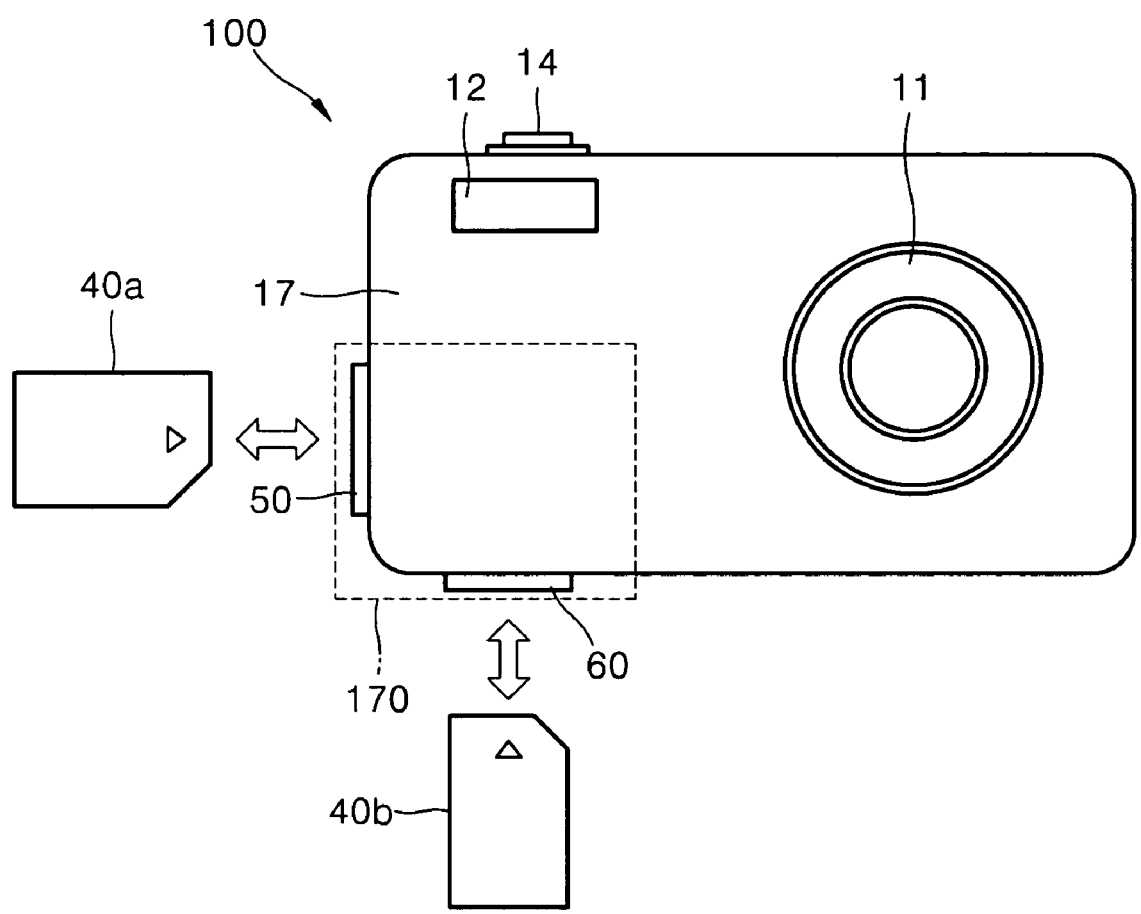
FIG. 3 is a front view of a digital image processing apparatus according to a first embodiment of the present invention.
Figure 4:
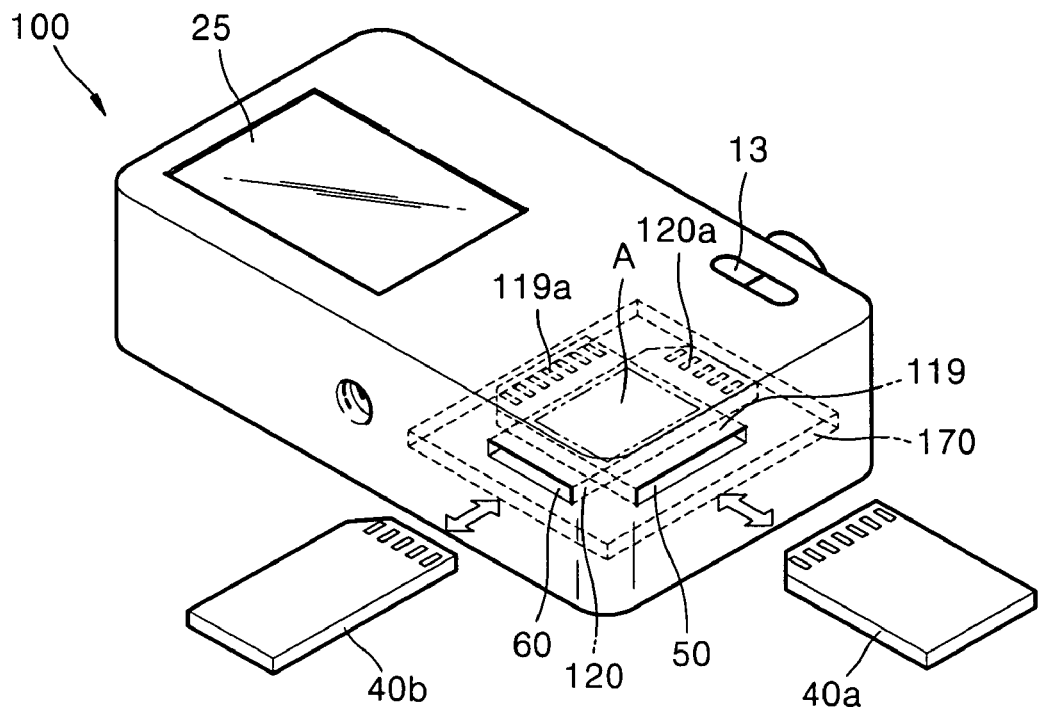
FIG. 4 is a perspective view of the rear of the digital image processing apparatus of FIG. 3.

FIGS. 3 and 4 are views of a digital image processing apparatus 100 according to a first embodiment of the present invention.

As illustrated in FIGS. 3 and 4, the digital image processing apparatus 100 includes a memory card slot 170 on one side thereof, to accommodate memory cards 40a and 40b.

The memory card slot 170 includes two memory card accommodating units 119 and 120, and two connecting ports 119a and 120a. The memory card accommodating units 119 and 120 are formed at a predetermined angle with respect to each other and share a predetermined space A, to accommodate the memory cards 40a and 40b of different standards. That is, as illustrated in FIG. 4, the memory card accommodating units 119 and 120 are formed as slots having two memory card entrances 50 and 60 formed at one corner of the digital image processing apparatus 100, each formed on different sides with respect to the corner, and the memory card accommodating units 119 and 120 over-lap each other inside the digital image processing apparatus 100 in the space designated as A. The connecting ports 119a and 120a are respectively installed within the memory card accommodating units 119 and 120. The memory cards 40a and 40b have connecting ports that connect with connecting ports 119a and 120a.

Memory cards of various standards such as a security digital (SD) card, a compact flash (CF) card, a micro drive (MD) card, a multi media card (MMC), a memory stick (MS), an xD-Picture Card, and a smart media card (SMC) can be used as the memory cards 40a and 40b. The shape and thickness of the memory card accommodating units 119 and 120 and the location and configuration of the connecting ports 119a and 120a may differ depending on the types of memory cards that are used.

A liquid crystal display (LCD) 25 and operating buttons including a zoom button 13 may be further formed on the rear of the digital image processing apparatus 100. In FIG. 4, however, some operating buttons are simplified or omitted to better explain the location of the memory card slot 170.

In the memory card slot 170, the memory card accommodating units 119 and 120 are the right sizes for the memory cards 40a and 40b and thus the two different types of memory cards 40a and 40b can be respectively inserted. Thus, both memory cards 40a and 40b are compatible in the digital image processing apparatus 10.

As a result, although the memory card slot 170 includes a plurality of memory card accommodating units 119 and 120, space for the memory card slot and the overall size of the digital image processing apparatus 100 remains approximately the same because the memory card accommodating units 119 and 120 share the predetermined space A. As compared to a conventional digital image processing apparatus in which separate memory card accommodating units are installed, this invention greatly reduces the space required for multiple memory card accommodating units. Of course, various types of memory cards can be used in the digital image processing apparatus 100.

Figure 5:
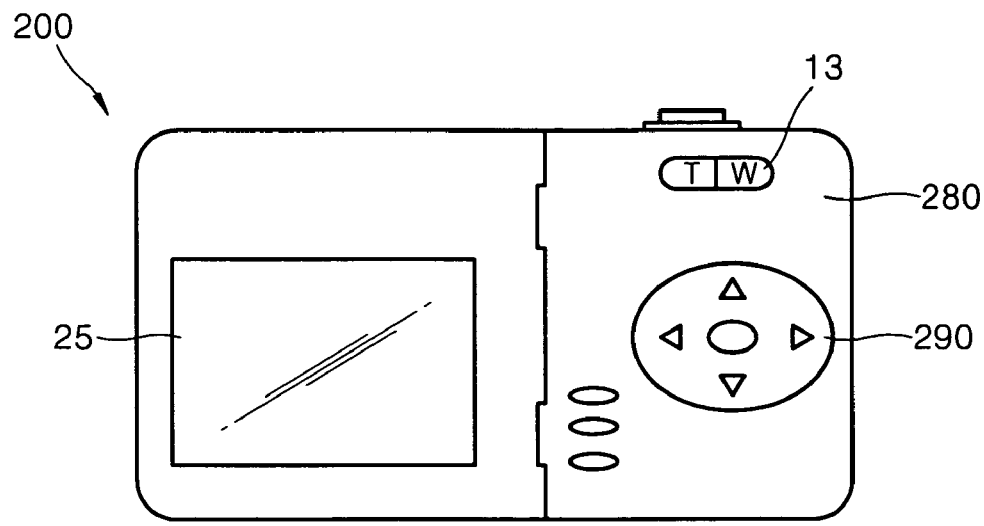
FIG. 5 is a rear view of a digital image processing apparatus according to a second embodiment of the present invention.
Figure 6:
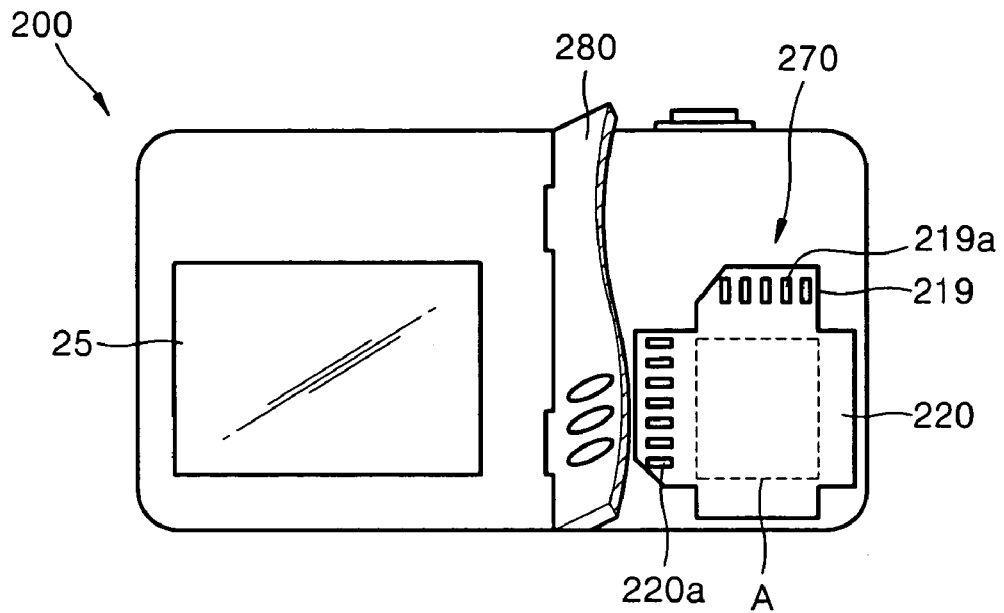
FIG. 6 is a view illustrating a structure underneath a cover of the digital image processing apparatus of FIG. 5.

FIGS. 5 and 6 are views of a digital image processing apparatus 200 according to a second embodiment of the present invention. FIG. 5 is a rear view of the digital image processing apparatus 200, and FIG. 6 is a view illustrating a structure underneath a cover 280 of the digital image processing apparatus 200.

As illustrated in FIGS. 5 and 6, the digital image processing apparatus 200 includes a cover 280 installed on the rear surface thereof, and a memory card slot 270 having two memory card accommodating units 219 and 220 installed under the cover 280.

An operating button 290 and a zoom button 13 may be formed on the top surface of the cover 280. The cover 280 acts to prevent memory cards (not shown) from being detached when in the memory card slot 270.

To accommodate two different types of memory cards compatibly, the memory card accommodating units 219 and 220 are formed at a predetermined angle from each other and share a predetermined space A. Unlike the memory card accommodating units 119 and 120 in the previous embodiment, the memory cards are inserted into or removed from the memory card accommodating units 219 and 220 from the back of the digital image processing apparatus 200. That is, when a single memory card is placed to match the shape and be parallel to one of the memory card accommodating units 219 and 220, the memory card moves in the direction towards the front or back of the digital image processing apparatus 200 to be inserted into or removed from the one of the memory card accommodating units 219 and 220, whereas the memory card in the previous embodiment moves in directions indicated by arrows illustrated in FIG. 4 to be inserted in and out from the memory card accommodating units 119 and 120.

Connecting ports 219a and 220a, which come in contact with corresponding connecting ports of the memory cards, are installed on one end of the memory card accommodating units 219 and 220.

Figure 7:
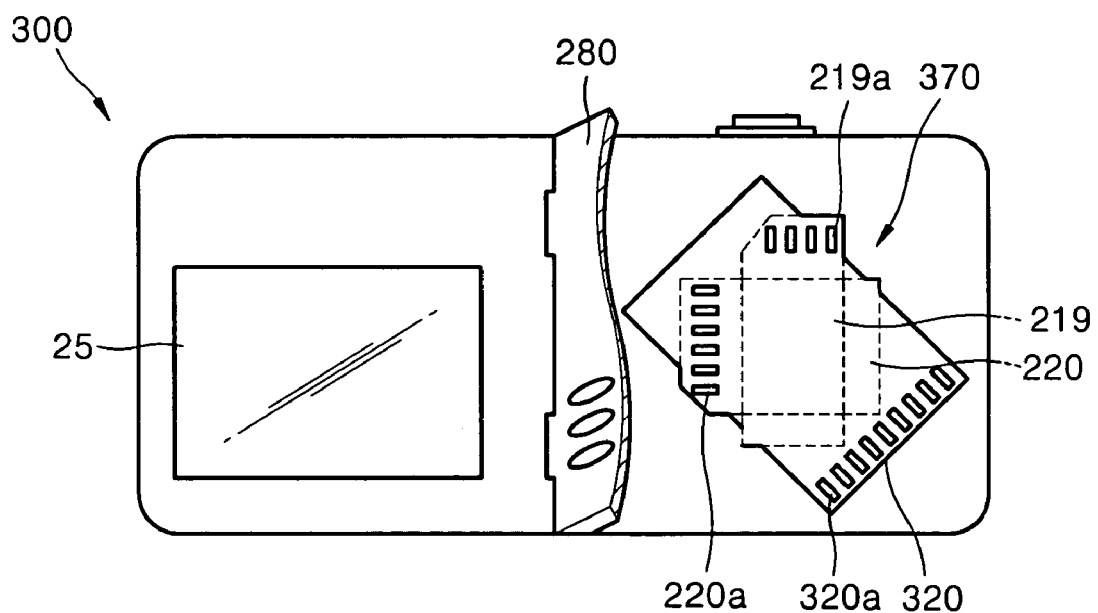
FIG. 7 is a view of a digital image processing apparatus according to a third embodiment of the present invention.

FIG. 7 is a view of a digital image processing apparatus 300 according to a third embodiment of the present invention. A cover 280 is opened to illustrate the internal structure of memory card accommodating units 219, 220, and 320.

The digital image processing apparatus 300 includes the cover 280 installed on the rear surface thereof, and the three memory card accommodating units 219, 220, and 320 under the cover 280. The memory card accommodating units 219, 220, and 320 are formed at predetermined angles with respect to one another and share a predetermined space, to accommodate three memory cards of different standards. That is, the respective memory card accommodating units 219, 220, and 320 are shaped like corresponding memory cards, and have a portion that is recessed from the rear surface of the digital image processing apparatus 300.

As in the previous second embodiment, the memory cards are inserted into or removed from the memory card accommodating units 219, 220, and 320 in a direction towards the front or rear of the digital image processing apparatus 300. Connecting ports 219a, 220a, and 320a, which come in contact with corresponding connecting ports of the memory cards, are respectively installed on one end of the memory card accommodating units 219, 220, and 320. The memory cards may be some of the examples listed above.

The second embodiment illustrates an example in which two memory card accommodating units 219 and 220 are formed, and the present third embodiment illustrates an example in which three memory card accommodating units 219, 220, and 320 are formed. However, the present invention is not limited to these numbers of memory card accommodators, and more than three memory card accommodating units may be disposed at a predetermined angle with respect to one another.

As described above, there is presented a digital image processing apparatus in which different types of memory cards can be used.

In addition, since a plurality of memory card accommodating units are compactly installed to share a predetermined space, the size of a memory slot can be reduced, thereby allowing the digital image processing apparatus including the memory card accommodating units to have a small size.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A memory storage device holder for a digital image apparatus comprising:
a first accommodating unit and a second accommodating unit, each having walls inside the digital image apparatus that define a cavity, wherein the accommodating units each have an opening to the outside of the digital image apparatus for receiving respective memory storage devices into the cavity, wherein the accommodating units are oriented such that the opening of the first accommodating unit is oriented in a different direction than the opening of the second accommodating unit, and the respective top and bottom of the first accommodating unit extend along the same respective planes as the respective top and bottom of the second accommodating unit such that at least a portion of the cavity of the first accommodating unit is shared at least partially with a portion of the cavity of the second accommodating unit.

2. The memory storage device holder of claim 1 wherein the digital image apparatus is a camera.

3. The memory storage device holder of claim 1, wherein each accommodating unit is generally shaped like the respective memory storage device that is to be received thereby.

4. The memory storage device holder of claim 1, wherein the accommodating unit is generally shaped like the memory storage device, wherein the memory storage device is selected from a group of memory storage devices consisting of a security digital card, a compact flash card, a micro drive card, a multi media card, a memory stick, an xD-Picture Card, and a smart media card.

5. The memory storage device holder of claim 1, wherein the accommodating units are disposed at approximately right angles to each other.

6. The memory storage device holder of claim 1 further comprising connecting pins that are formed on at least one side of each of the accommodating units.

7. A digital image apparatus comprising:
a housing;
a chamber within the housing for accommodating a plurality of different types of memory storage devices;
a plurality of accommodating units disposed within the chamber wherein each accommodating unit has a plurality of sides, a top, a bottom, and a cavity, wherein a first accommodating unit and a second accommodating unit extend in respective lengthwise directions with the respective top and bottom of the first accommodating unit extending along the same respective planes as the respective top and bottom of the second accommodating unit such that the first and second accommodating units at least partially intersect and the cavity of each accommodating unit at least partially overlaps, wherein each accommodating unit is adapted to receive one of the plurality of different types of memory storage devices;
an opening on one side of each accommodating unit for receiving the memory storage device into the cavity, wherein the accommodating units are oriented such that the opening of the first accommodating unit is oriented in a different direction than the opening of the second accommodating unit; and
connecting pins that are formed on at least one side of each of the plurality of accommodating units.

8. The digital image apparatus of claim 7 wherein the digital image apparatus is a camera.

9. The digital image apparatus of claim 7, wherein the respective accommodating units are generally shaped like corresponding memory storage devices.

10. The digital image apparatus of claim 7, wherein the plurality of memory storage devices include memory storage devices selected from the group consisting of a security digital card, a compact flash card, a micro drive card, a multi media card, a memory stick, an xD-Picture Card, and a smart media card.

11. The digital image apparatus of claim 7, wherein two of the memory storage device accommodating units are disposed at approximately a right angle to each other.

12. The digital image apparatus of claim 7 wherein each opening is generally slot shaped.

13. A digital image apparatus comprising:
a housing having an opening;
a cover over the opening;
a chamber within the housing for accommodating a plurality of different types of memory storage devices;
a plurality of accommodating units disposed within the chamber wherein each accommodating unit has a plurality of sides, a top, a bottom, and a cavity, wherein a first accommodating unit and a second accommodating unit extend in respective lengthwise directions with the respective top and bottom of the first accommodating unit extending along the same respective planes as the respective top and bottom of the second accommodating unit such that the first and second accommodating units at least partially intersect and the cavity of each accommodating unit at least partially overlaps, wherein each accommodating unit is adapted to receive one of the plurality of different types of memory storage devices;
an opening on a side of each accommodating unit for receiving the memory storage device into the cavity; and
a set of connecting pins formed on at least one side of each of the plurality of accommodating units and oriented such that each set of connecting pins is oriented in a different direction than the other set of connecting pins.

14. The digital image apparatus of claim 13 wherein the digital image apparatus is a camera.

15. The digital image apparatus of claim 13, wherein each respective accommodating unit is in the shape of one of the plurality of different types of memory storage devices.

16. The digital image apparatus of claim 13, further comprising a memory storage device removably attached to at least one accommodating unit.

17. The digital image apparatus of claim 13 further comprising a memory storage device removably attached to at least one accommodating unit, wherein the memory storage device is a memory storage device selected from the group consisting of a security digital card, a compact flash card, a micro drive card, a multi media card, a memory stick, an xD-Picture Card, and a smart media card.

18. The digital image apparatus of claim 13, wherein two of the memory storage device accommodating units are disposed at approximately a right angle to each other.

19. The digital image apparatus of claim 13 wherein each accommodating unit is at least partially recessed from a surface surrounding the opening of the accommodating unit.

20. The digital image apparatus of claim 13 wherein the cover can be opened and closed and when open reveals each accommodating unit opening.

* * * * *